O. E. GELBRICH & G. W. HINTZ.
CAR DOOR HANGER.
APPLICATION FILED DEC. 19, 1911.
1,136,118.
Patented Apr. 20, 1915.
2 SHEETS—SHEET 1.
Fig. 1.
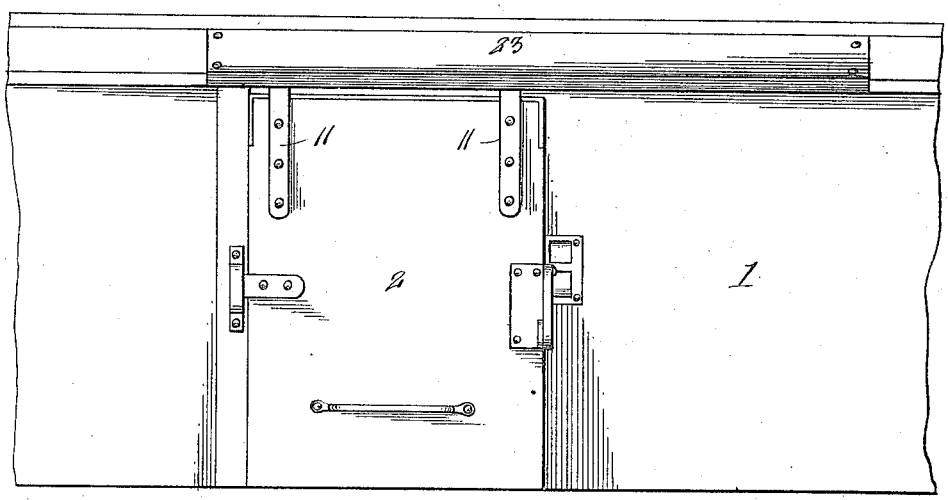
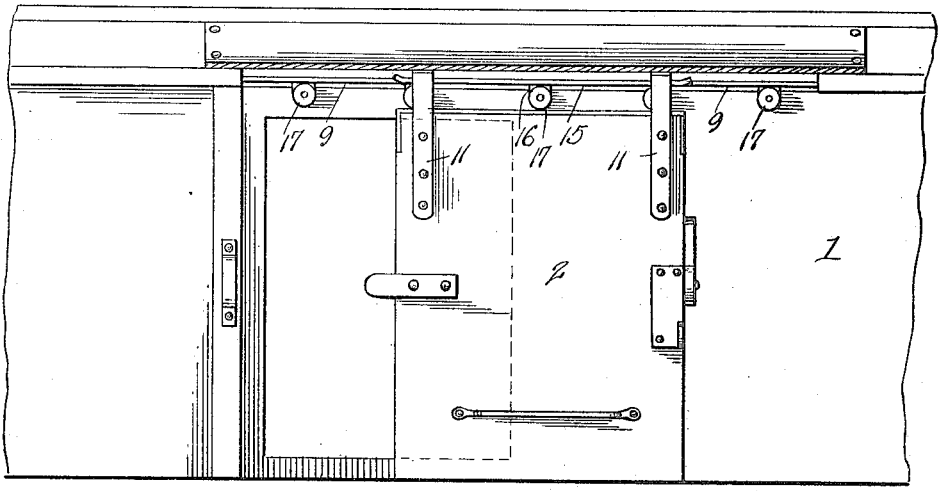
Fig. 2.
WITNESSES
G. M. Spring
J. Reaney Kelly
INVENTORS
Otto E. Gelbrich,
Gustav W. Hintz, by
Richard B. Owen
their Attorney O. E. GELBRICH & G. W. HINTZ.
CAR DOOR HANGER.
APPLICATION FILED DEC. 19, 1911.
1,136,118.
Patented Apr. 20, 1915.
2 SHEETS—SHEET 2.
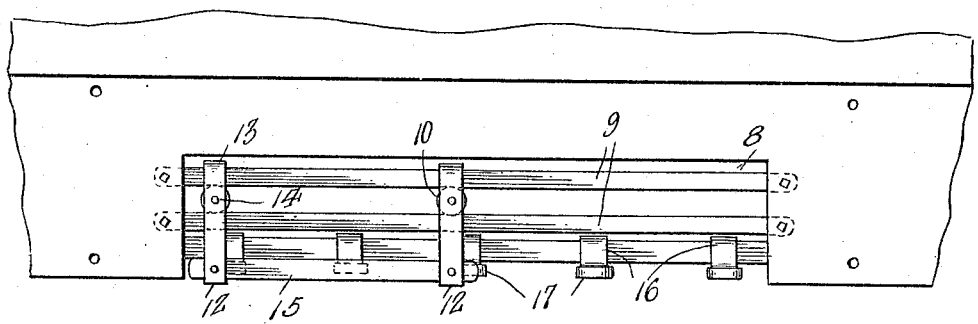
Fig. 3.
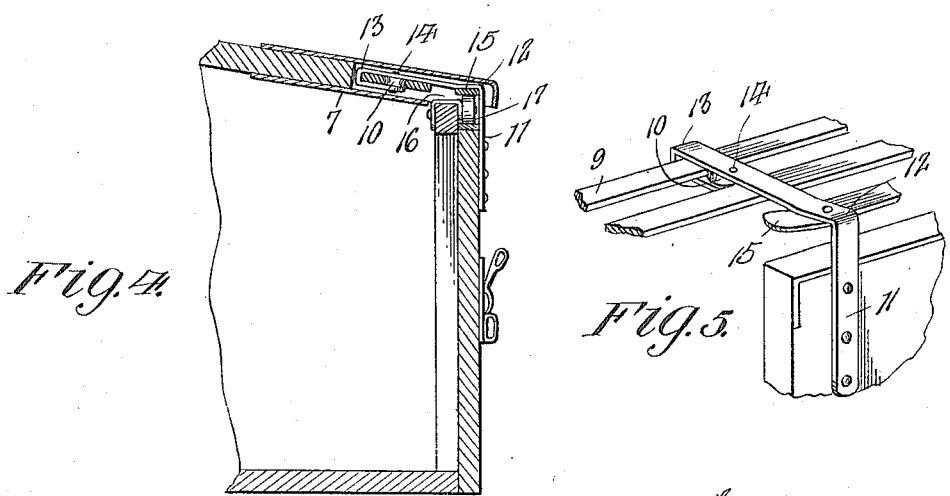
Fig. 4.
Fig. 5.
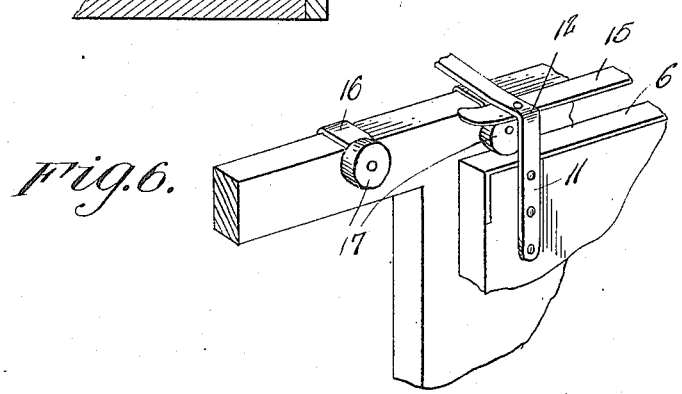
Fig. 6.

UNITED STATES PATENT OFFICE.

OTTO E. GELBRICH AND GUSTAV W. HINTZ, OF SOUTH BEND, INDIANA.

CAR-DOOR HANGER.

1,136,118.  Specification of Letters Patent. Patented Apr. 20, 1915.

Application filed December 19, 1911. Serial No. 666,725.

*To all whom it may concern:*

Be it known that we, OTTO E. GELBRICH and GUSTAV W. HINTZ, citizens of the United States, residing at South Bend, in the county of St. Joseph and State of Indiana, have invented new and useful Improvements in Car-Door Hangers, of which the following is a specification.

Our invention relates to means for mounting car doors and the like.

An object of our invention is to provide means for mounting car doors, which means prevent the door from sagging when in an open position.

A further object of our invention is to provide means for mounting car doors which means allow the door to slide freely, thereby making the door easy to operate.

A still further object of our invention is to provide a means for mounting car doors which means is simple in construction thereby making it easy to manufacture.

A still further object is to provide means for slidably mounting car doors which means is applicable to different forms of cars now in use, and can be easily attached to or detached from the same.

With the foregoing and other objects in view, our invention consists in such details of construction and in the arrangement and combination of parts as will be hereinafter fully described and specifically pointed out in the appended claims.

In describing our invention in detail, reference will be had to the accompanying drawings wherein like characters denote like or corresponding parts throughout the several views, and in which:—

Figure 1 is a fragmentary view of a car showing our invention in place thereon. Fig. 2 is a fragmentary view of a car showing out invention in place thereon and showing parts of the same in section. Fig. 3 is a plan view of a section of a car body disclosing the inner working parts of our invention. Fig. 4 is a vertical sectional view of a section of a car showing our invention in place thereon. Fig. 5 is a perspective view of a detail. Fig. 6 is another detail.

In carrying our invention into practice, we preferably use the same in connection with car doors and bodies, however we desire it to be understood that we do not limit ourselves to this specific disposition and that it may be used in connection with any other structure desired. Positioned upon the upper part of the door 2 and for purpose of reinforcement as well as for a purpose that will presently appear is a metallic strip 6. The car body 1 has the metallic sheet 7 secured to the underside of the top thereof, and is provided with a cut out portion 8 as is clearly shown in Fig. 3. Connected to the plate 7 by means of bolts or other suitable fastening devices are guide members 9, these guide members are spaced apart so as to form a track or passage way for the wheels or rollers 10 and span the opening 8 of the plate 7. For an obvious purpose the arms 11 are carried by the door 2 and are bent at substantially right angles as shown at 12 and are again bent as shown at 13 so as to extend under one of the guide members 9. The pins 14 are journaled in the arms 11 and are adapted to support the wheel 10. We may also provide a cross arm 15 which connects the arms 11 as is shown, whereby, they are kept from spreading.

It will now be readily seen from the foregoing that the door 2 is held in slidable engagement with the body 1, and the same will slide thereupon easily.

For purpose of making the door easier to operate we position upon the body 1 the brackets 16, which brackets carry the wheels 17, which wheels are adapted to engage the strip 6 and the cross arm 15. By providing the extra wheels 17 the door may be operated more easily and the supporting structure of the door is also reinforced as is obvious.

We dispose upon the body 1 for purpose of covering the supporting mechanism of the door, the metallic sheet 23 which is clearly shown in Fig. 1, thereby keeping the working parts clean.

It is thought from the foregoing that the advantages and novel features of our invention will be appreciated.

We desire it to be understood that we make slight changes in the construction and in the arrangement and combination of parts without departing from the spirit of our invention provided such changes fall within the scope of the appended claims.

Having thus fully described our invention, what we claim as new and desire to secure by Letters Patent is:—

1. A car door hanger comprising a strip and a cross arm carried by said door, guide members mounted on the car, means carried by said door to engage with and travel on said guide members mounted on the car, and means secured on the car upon which a strip and a cross arm carried by said door rest and are moved as the door is opened and closed.

2. A car door hanger comprising a strip and a cross arm mounted on the door, guide members secured to the car adjacent the door, rollers secured on said door to engage with and travel on the guide members mounted on the car, and rollers secured on the car adjacent the door in such relation that a strip and a cross arm carried by the door work thereon during the opening and closing of said door.

3. A car door hanger comprising a strip and a cross arm rigidly connected on the door to be moved therewith, guide members secured to the car adjacent the door opening, brackets carried by said door to extend adjacent the guide members secured on the car, brackets supported on the car to project within the confines of a strip and a cross arm by the door, means carried by the brackets secured to the door to engage with and travel on the guide members mounted on the car, and means mounted on the brackets secured to the car to be engaged by and to have a strip and a cross arm secured to the door to travel thereon.

4. In a device of the character described, a car body having guide members supported thereby and at the top thereof, brackets supported by said car body, rollers revolubly supported by said brackets, a door having arms projecting upwardly therefrom, said arms adapted to be bent intermediate their ends, means connecting said arms and adapted to engage said rollers, means carried by the upper portion of said door adapted to engage said rollers, said arms adapted to be bent near their upper ends, whereby other rollers may be supported, said last named rollers adapted to operate between said guide members for the purpose described.

OTTO E. GELBRICH.
GUSTAV W. HINTZ.

Witnesses:
JNO. T. KELLEY,
GEORGE W. STEUART.

Copies of this patent may be obtained for five cents each, by addressing the "Commissioner of Patents, Washington, D. C."